United States Patent
Schaefer et al.

(10) Patent No.: US 8,566,815 B2
(45) Date of Patent: Oct. 22, 2013

(54) MECHANISM FOR UPDATING SOFTWARE

(75) Inventors: Manfred Schaefer, Forstinning (DE);
Wolf-Dietrich Moeller, München (DE)

(73) Assignee: Nokia Siemens Networks Oy, Espoo (FI)

(*) Notice: Subject to any disclaimer, the term of this patent is extended or adjusted under 35 U.S.C. 154(b) by 19 days.

(21) Appl. No.: 13/318,622

(22) PCT Filed: May 4, 2009

(86) PCT No.: PCT/EP2009/003179
§ 371 (c)(1),
(2), (4) Date: Dec. 13, 2011

(87) PCT Pub. No.: WO2010/127679
PCT Pub. Date: Nov. 11, 2010

(65) Prior Publication Data
US 2012/0096450 A1    Apr. 19, 2012

(51) Int. Cl.
*G06F 9/44* (2006.01)
*G06F 9/445* (2006.01)

(52) U.S. Cl.
USPC .......................................... 717/168; 717/178

(58) Field of Classification Search
USPC ....................................................... 717/168
See application file for complete search history.

(56) References Cited

U.S. PATENT DOCUMENTS

| | | | |
|---|---|---|---|
| 5,987,536 A * | 11/1999 | Johnson et al. | 710/36 |
| 6,282,643 B1 * | 8/2001 | Cromer et al. | 713/2 |
| 6,615,404 B1 * | 9/2003 | Garfunkel et al. | 717/173 |
| 7,150,013 B2 * | 12/2006 | Kim | 717/168 |
| 7,350,205 B2 * | 3/2008 | Ji | 717/172 |
| 8,156,316 B2 * | 4/2012 | Wood et al. | 713/1 |
| 8,223,653 B2 * | 7/2012 | Wild et al. | 370/241 |
| 8,364,942 B2 * | 1/2013 | Wood et al. | 713/1 |
| 2003/0037246 A1 * | 2/2003 | Goodman et al. | 713/191 |
| 2003/0074658 A1 * | 4/2003 | Kim | 717/168 |
| 2003/0154471 A1 * | 8/2003 | Teachman et al. | 717/171 |
| 2004/0076043 A1 * | 4/2004 | Boals et al. | 365/200 |
| 2004/0153718 A1 * | 8/2004 | Shen et al. | 714/5 |
| 2005/0204353 A1 * | 9/2005 | Ji | 717/168 |
| 2005/0216753 A1 * | 9/2005 | Dailey et al. | 713/191 |
| 2007/0016761 A1 * | 1/2007 | Almeida et al. | 713/1 |
| 2012/0096450 A1 * | 4/2012 | Schaefer et al. | 717/168 |

FOREIGN PATENT DOCUMENTS

| EP | 1447733 A1 | 8/2004 |
|---|---|---|
| WO | 98/15082 | 4/1998 |

OTHER PUBLICATIONS

International Search Report and Written Opinion corresponding to International Application No. PCT/EP2009/003179 dated Jan. 27, 2010.

* cited by examiner

*Primary Examiner* — Don Wong
*Assistant Examiner* — Marina Lee
(74) *Attorney, Agent, or Firm* — Squire Sanders (US) LLP

(57) ABSTRACT

Arrangements for updating software, such as initial trusted code and data, are described, including providing proof of execution of the update. The mechanism for updating the software is logically or physically separated from the general purpose CPU of the system. Thus, the update mechanism can be trusted even if the system to be updated may be compromised.

17 Claims, 3 Drawing Sheets

MECHANISM FOR UPDATING SOFTWARE

The invention is directed to the updating of software.

The Trusted Computer Group (TCG) is a standardization body that cares for the development of open, vendor-neutral building blocks and software interfaces to promote and to support trusted computing mechanisms. The most prominent TCG standard is the Trusted Platform Module (TPM), which essentially is a chip specification describing a dedicated cryptographic co-processor unit to ensure the secure start-up of a system from the beginning (i.e. starting with hardwired reset cycles) or even dynamically, using, for example, the dynamic root for trust management (DRTM) approach. By applying TPM mechanisms, any software loaded during the boot process or on running a DRTM operation is measured and on request this information can be reported securely to an outside challenger. The provision of such measurement data is referred to as attestation.

The security of mobile communication devices presents a number of additional challenges. In an attempt to address some of these challenges, the TCG developed the Mobile Trusted Module (MTM) specification. MTM was initially developed with the needs of mobile telephones in mind, but it has potentially broader application.

Among other concepts, MTM introduces the principle of secure booting, which in addition to measuring any software before loading, prevents any software module failing verification checks from loading. In addition, MTM is based on certificates for the software verification process, where TPM uses pure hashes over software modules, not allowing e.g. proof of origin of this software etc.

The TCG-based security schemes referred to above rely on the use of invulnerable software and on statically proving software integrity, either at boot-time or at software download time (or both). Detected software flaws are taken care of by providing a new software version to the device, which version corrects the earlier errors. Such schemes do no directly provide protection against run-time attacks (e.g. such as software exploits) that intend to take control over a system while it is in operation.

In TCG-based systems, attestation is used to prove after a completed boot process that a system has the required software (e.g. the correct software versions) loaded. However, attestation requires significant organizational and implementation efforts, both in terms of the attestation infrastructure required in the network and in devices.

Secure booting, for example in combination with autonomous validation (which waives attestation, completely trusting the local verification and enforcement of the boot process by releasing authentication keys only if a system is in a predefined, expected state) reduces attestation infrastructure costs or even completely avoids any explicit attestation step. But certain exploits could prevent reliable and verifiable software updates of the device, which could leave the system with an old, flawed software version. This would leave the device in a state, where the old, flawed software version is still booted by secure boot, and still accepted as a valid version, even if the new software version should be enforced. Therefore a potential security risk exists in this case. Thus, relying on secure boot alone is not always sufficient.

Note, that this risk also exits in cases where an attestation mechanism in combination with a trusted boot arrangement is used, as TCG does not define any mechanism for secure software updates, and explicitly excludes this for some 'immutable' parts of the trusted code (such as the so-called CRTM as explained below).

In MTM, and in the other TCG-based security solutions, core root of trust for measurement (CRTM) is typically a key factor for security. The CRTM specifies predefined policies and performs platform integrity measurements. The platform integrity measurements may include measuring system level metrics or conducting an integrity test for the intended user of a device. Due to the importance of the CRTM in establishing a trusted computing environment, TCG suggests that the CRTM be immutable (i.e., unchangeable). If part or all of a device's Basic Input/Output System (BIOS) is used as the CRTM, a conflict arises in that updating the BIOS is sometimes desirable or even necessary. Current BIOS flash methods rely on application level flash utilities that enable hackers and/or rogue applications to undesirably modify part or all of a BIOS.

Furthermore, in practice, providing an immutable CRTM is quite difficult, both due to physical attacks and due to organizational needs that require possibilities for remote infield upgrading. In many cases it is sufficient to ensure 'immutability' of the CRTM with respect to remote software attacks (e.g. exploits, which are software, data or commands that exploit a vulnerability in a system in order to cause an unintended behaviour of the system), and not to attacks requiring physical attendance at the element. Such remote or pure software attacks are typically the more important risk to security, even if the risks due to physical attacks are not negligible. But even TCG technology only provides limited shields against physical attacks.

It is known that in some cases even the CRTM can be entirely over-written (referred to as being "re-flashed") via a remote software attack (e.g. an exploit). Accordingly, even the reliability of trusted/secure boot process, together with attestation, is not sufficient. In the event that an attacker succeeds in changing the CRTM code, software update processes and verification steps carried out during system booting become irrelevant.

It should be noted that CRTM is only one example of initial trusted code and data known in the art. The present invention is relevant to all such initial (or core) trusted code and data arrangements.

The present invention seeks to address at least some of the problems outlined above.

According to an aspect of the invention, there is provided a module comprising: an input for receiving a request from an external source to update a software element of a system, wherein the system includes a central processing unit; and an output for providing a response to the external source indicating whether or not the update has been successfully completed, wherein the module is adapted to modify the software in accordance with the request, wherein the module has write access to the software that is denied to the central processing unit (typically a general purpose CPU). In one form of the invention, the module is an autonomous circuit that works independently of the CPU. The module may form part of a system comprising an input for receiving a request from an external source to update a software element of the system, a central processing unit, an output for providing a response to the external source indicating whether or not the update has been successfully completed, and the module as set out above.

According to another aspect of the invention, there is provided an apparatus comprising: an input for receiving a request from an external source to update a software element of the system; a central processing unit; a module (such as the module set out above) adapted to modify the software in accordance with the request, wherein the module has write access to the software that is denied to the central processing unit; and an output for providing a response to the external source indicating whether or not the update has been successfully completed.

According to a further aspect of the invention, there is provided a method (such as a method of updating software), the method comprising: receiving, at a first module (such as a programming engine) a request to update a software element of a system, wherein the system includes a central processing unit; updating the software element under the control of the first module in accordance with the request, wherein the module has write access to the software that is denied to the central processing unit (typically a general purpose CPU); and providing a message to the source of the request indicating whether or not the software has been successfully updated. In some forms of the invention, the steps of the method are required to be carried out in a mandatory and non-interruptible sequence.

The software element may be stored within a memory of the apparatus or the module of the present invention. The software element may be stored within a portion of a memory of the apparatus. In some forms of the invention, the memory is a flash memory. The memory could take many other forms, such as a write-protected HDD or a USB memory stick. Other suitable memory formats will be known to those skilled in the art. In some forms of the invention, the memory may be persistent (e.g. PROM or non-volatile SRAM), i.e. retaining content when power is turned off. In other forms of the invention, the memory may be volatile (e.g. RAM).

The software element may be stored within a memory of the system. As discussed above, that memory may take many forms. Furthermore, the software element may be stored within a portion of the memory that is programmable by the module but is not (or at least not normally) programmable by the central processing unit. The module may have access to a portion of memory containing the software module.

In some forms of the invention, the said module is provided as part of said memory. In alternative forms of the invention, the said module is provided as part of the central processing unit (CPU). In forms of the invention where the module is provided as part of the CPU, the module may be adapted to update software stored in said portion of said memory only when the CPU is in operating in a protected mode. Said CPU may be prevented from entering said protected mode, except via a custom application programming interface (API).

A checking module may be provided for checking the validity of the request. The updating of the software may be carried out only if the checking module indicates that the software should be updated.

In many forms of the invention, the module and the central processing unit are logically separated. Furthermore, in many forms of the invention, the module and the central processing unit are physically separated. By way of example, the module may provide dedicated circuit logic that separates normal CPU activities from software update operations. Thus, the first module may be provided as an autonomous circuit that works independently of the central processing unit.

The said software code may comprise initial trusted software and data (such as CRTM). As is known in the art, the initial trusted software may be the sole memory content allowed to initialise the system.

In many forms of the invention, the software module is protected against write access from a general purpose central processing unit. Furthermore, in many forms of the invention, the module is the only entity having write access to the software. Thus, not only is the CPU (at least generally) excluded from having write access to the software, but other mechanisms (such as DMA access) are prevented or prohibited.

In some forms of the invention, the module takes control of the system from the central processing unit. In such an arrangement, the method of the invention may be carried out in its entirety before control is returned to the CPU. As noted above, in some forms of the invention, the method of the invention is required to be carried out in a mandatory and uninterrupted manner.

The software element may be stored within a portion of memory that is programmable by the first module but is not (normally) programmable by the central processing unit. The module may be provided as part of said memory.

Alternatively, the first module may be provided as part of the central processing unit. In such an arrangement, the first module may be adapted to update software only when the central processing unit is in operating in a protected mode. Such an arrangement may be implemented by providing two privilege modes, a first in which the CPU acts as normal and a second in which the content of the memory software can be updated. It may only be possible to enter the protected mode via API commands or some other "special entry" process. Other entry points may be ignored and/or result in a failure state/message.

In many forms of the invention, management or control operations take place on the network side as a consequence of the update request/response protocol described herein. For example, connectivity to the network may be denied if the update request/response protocol is not completed (i.e. if the appropriate response is not received on the network side).

According to a further aspect of the invention, there is provide a computer program product comprising: means for receiving, at a first module a request to update a software element of a system, wherein the system includes a central processing unit; means for updating the software element under the control of the first module in accordance with the request, wherein the module has write access to the software that is denied to the central processing unit; and means for providing a message to the source of the request indicating whether or not the software has been successfully updated.

According to another aspect of the invention, there is provided a computer program product comprising: code for receiving, at a first module a request to update a software element of a system, wherein the system includes a central processing unit; code for updating the software element under the control of the first module in accordance with the request, wherein the module has write access to the software that is denied to the central processing unit; and code for providing a message to the source of the request indicating whether or not the software has been successfully updated. The computer program may be a computer program product comprising a computer-readable medium bearing computer program code embodied therein for use with a computer.

Exemplary embodiments of the invention are described below, by way of example only, with reference to the following numbered drawings.

FIG. 1 is a flow chart showing an algorithm, indicated generally by the reference numeral 1, in accordance with an aspect of the present invention.

The algorithm 1 starts at step 2, where a software update request is sent to a control module. The software update request may, for example, be sent from an Operating and Administration Management (OAM) server to a control module. The request 2 may be protected, for example against a replay attack. In one form of the invention, the request 2 provides updated CRTM software (or some other initial code/data), but the request can provide other updated software.

In response to the software request, the algorithm 1 moves to step 4 where the control module checks the validity of the software update request. As described in more detail below, the step 4 may include checking signatures used to sign messages.

If the step 4 concludes that the software update request is valid, the algorithm 1 moves to step 6, where the control module updates flash memory (or some other updateable memory) including the software to be updated (e.g. the CRTM software).

Finally, at step 8, the control module returns a confirmation message to the OAM server indicating that the update has been successful. The confirmation message may be protected, for example using a signing key, as described further below.

Thus, the algorithm 1 enables software to be updated under the control of a reliable control module. As described in detail below, the control module is logically separated from the general purpose CPU so that the control module can update a software module residing on the flash memory, but the general purpose CPU (which may be running some malicious software injected from outside) is not able to update the software modules residing on the flash memory. Thus, the software updating mechanism can be trusted in circumstances in which the system being updated is compromised.

Figure 2:
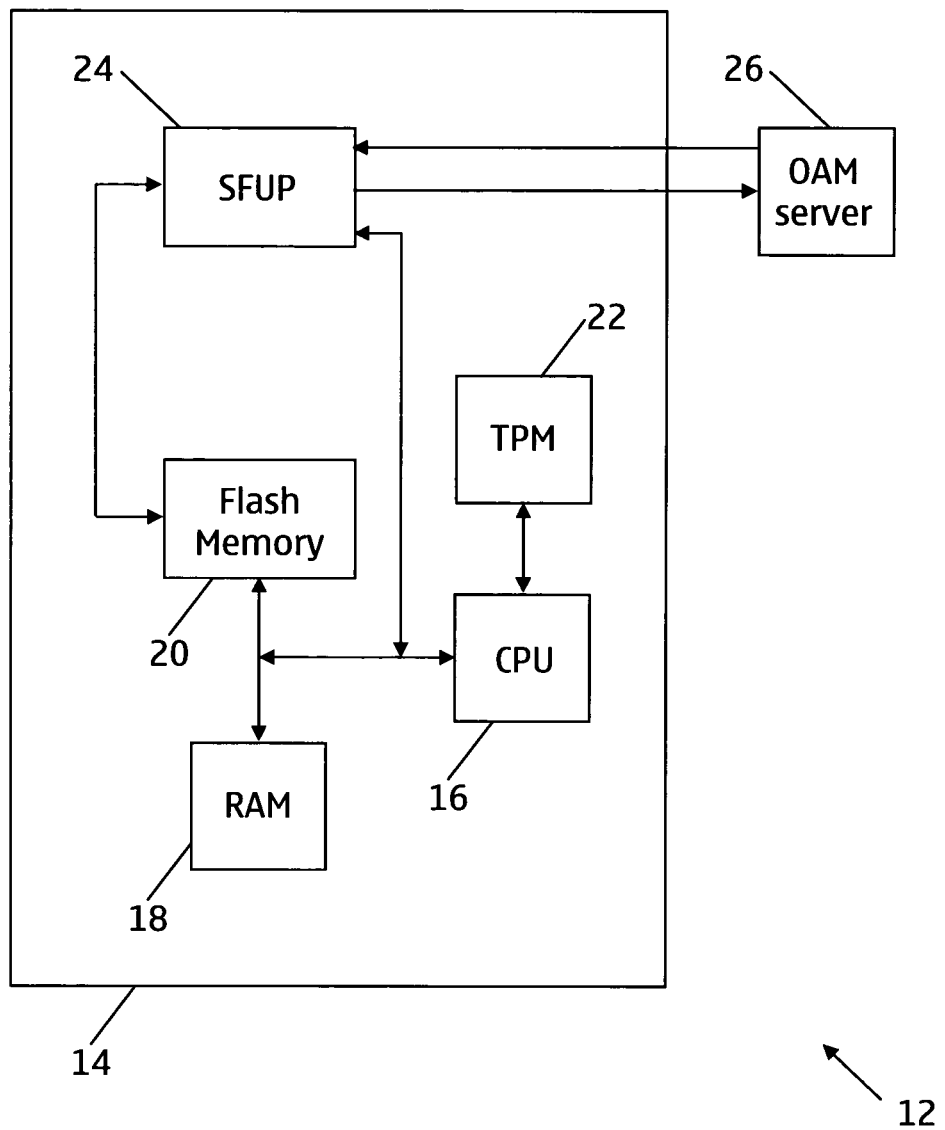
FIG. 2 shows a system in accordance with an aspect of the present invention.

FIG. 2 in a block diagram, indicated generally by the reference numeral 12, of a system in accordance with an aspect of the present invention. The algorithm 1 described above can be implemented using the system 12.

The system 12 includes a computer system 14. The computer system comprises a central processing unit (CPU) 16, a random access memory module (RAM) 18, a flash memory module 20, a trusted platform module (TPM) 22, and a secure flash update process module (SFUP) 24. The system 12 additionally comprises an external challenger, which in the example of FIG. 1, takes the form of an Operation, Administrative and Management (OAM) server 26.

As shown in FIG. 2, the CPU 16 is in two-way communication with the RAM 18, flash memory 20, TPM 22 and SFUP module 24. In addition, the SFUP module 24 is in two-way communication with both the flash memory 20 and the OAM server 26. It should be noted, however, that FIG. 2 shows the logical arrangement of the various elements of the system 12. When implemented, messages, for example between the OAM server 26 and the SFUP 24, may be tunnelled thorough the CPU, memory, system bus etc.

Figure 1:
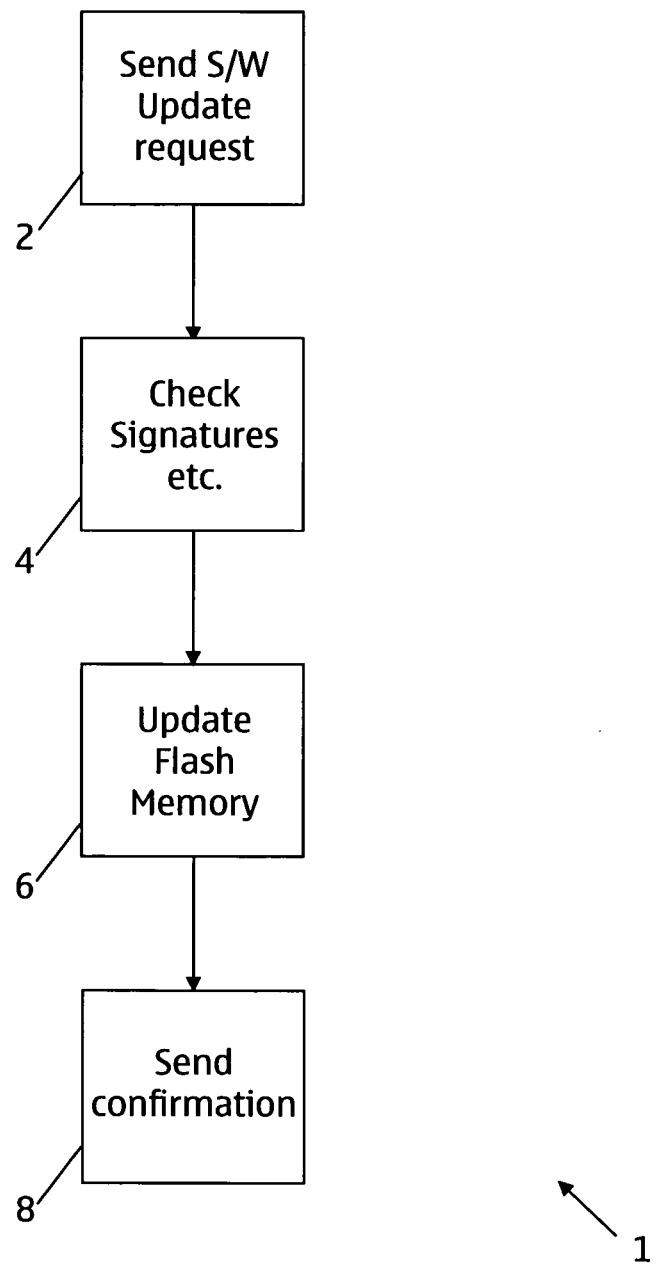
FIG. 1 is a flow chart demonstrating an aspect of the present invention.

The SFUP module 24 is shown as a discrete functional module and that module may indeed be provided as a separate circuit element. Alternatively, however, the SFUP module 24 may form part of the flash memory module 20. In other words, the functionality of the SFUP 24 may be provided as part of the flash memory module 24. The important fact to note in the arrangement of FIG. 1 is that the functionality of the SFUP module 24 is not provided by the general purpose CPU 16.

The computer system 14 may, for example, form part of a mobile communication device or of a network element.

The TPM module 22 ensures the secure start-up of a system from the beginning (i.e. starting with hardwired reset cycles). By applying TPM mechanisms any software loaded during the boot process is measured and on request this information can be reported securely to an outside challenger, such as the OEM module 26. As is known in the art, the TPM 22 makes use of CRTM boot software stored in the flash memory module 20 as part of the TPM process, although, in other embodiments of the invention, different initial code and data arrangements could be used.

As explained above, the initial trusted code and data (such as CRTM software) is typically required to be immutable, that is it cannot be over-written, or amended in any way. However, the system 12 provides a mechanism by which the CRTM software can be over-written, in part or completely, under the control of the SFUP module 24. Importantly, however, the CPU 22 does not have permission to write to the flash memory 20 (or at least a portion containing the CRTM). Accordingly, it is not possible for the CPU 22 to replace or update the CRTM. Thus, it is not possible for malicious software to take control of the CPU 22 and use the CPU to over-write the CRTM.

As indicated above, the system 12 can be used to implement the algorithm 1 described above.

The software update request 2 may take the form of a message sent from the OAM server 26 to the SFUP module 24. The message may take the following form:

$$A: [\text{Upd-requ}, SW, SW\ \text{cert}_{SWP}, \text{nonce}] + \text{SIG}_{OAM} \qquad [A]$$

Where:
"Upd-requ" is a request to update a particular software element;
"SW" is the software itself, for example in the form of a block of data
"SW cert" is a software certification that describes what the software should contain. This may, for example, contain a hash value over the software to protect its integrity
"SWP" is a signature of the software provider. Thus, the software certificate is signed by the software provider to demonstrate to third parties that the software certificate originated from the software provider.
"nonce" is a random (or pseudo-random) value that provides protection against replay attacks and the like
"+" indicates that the two parts of the message are concatenated as a single data stream
$\text{SIG}_{OAM}$ is a signature of the OAM server 26.

The software update request 2 is received by the SFUP module 24. The SFUP module securely stores a number of certificates required for the software update process. These certificates include the SWP certificate and OAM certificate referred to above and also include a SFUP certification (i.e. a certificate for the SFUP 24). The various certificates may be permanently stored by the SFUP 24, i.e. in a form that cannot be deleted or modified.

As indicated in the algorithm 1, on receipt of the software update request, the SFUP 24 checks (at step 4) the signatures included in the software update request. For example, the SFUP 24 may perform one or more of the following checks:
Is the signature for the OAM server 26 recognised?
Has the software certificate (SW cert) been signed by the software provider (SWP)?
Does the software certificate correspond to the software provided?
Is the version of the new software correct? This step requires a mechanism (not shown) to identify and store the status of the software release currently used in the flash memory.

If any of the checks carried out by the SFUP 24 fails, the software update request is refused. If all of the checks pass, then the algorithm 1 moves to step 6, where the flash memory is updated using the software SW included in the software update request.

Once the software stored in the flash memory 20 has been updated, a confirmation message 8 is sent to the OAM server 26. The confirmation message may take the following form:

$$C:[\text{Upd-resp,nonce}]+\text{SIG}_{SFUP} \quad [C]$$

Where:
"Upd-resp" is a response issued by the SFUP module 24;
"nonce" is the nonce provided in the software update request and identifies the request that is being replied to
"+" indicates that the two parts of the message are concatenated as a single data stream
$\text{SIG}_{SFUP}$ is a signature of the SFUP module 24.

The Upd-resp message indicates whether or not the requested software update has been implemented successfully. Accordingly, on receipt of the confirmation 8, the OAM server 26 will know, from the Upd-resp message, whether the software has been updated or not. The OAM server 26 can also be assured that the message 8 has been issued by the SFUP (on the basis of the keys used) and that the message is in response to the message issued by the OAM server (by virtue of the use of the nonce issued by the OAM server).

On receipt of the confirmation message 8, the OAM server 26 may carry out further steps. By way of example, the OAM server 26 may instruct the SFUP system to reboot the system 12.

On the network side (e.g. via OAM or specific network management entities) the preparation and in particular the messages sent back from the network element or device in which the SFUP module 24 is implemented, enable or require mechanisms to handle the trustworthiness of a network element in the context of an applied network security policy. For instance, during authentication the connectivity to network functions could be denied if an OAM server previously detected failures in the individual software update processes of involved network elements or devices. There might be other instances involved, such as authentication servers or security gateways that have to be informed by the OAM server of necessary decisions to be taken. These mechanisms may be implemented using white/black-lists of network elements.

In the message sequences described above, examples for protocol implementations are given. The examples use intrinsically secure messages not requiring a secure channel, but the principles could also be conveyed using other suitable protocols, such as internet protocol security (IPSEC) or transport layer security (TLS). However, it is important that the verifications within SFUP can be performed in the described way and the mutual trust relations can be assured. The certificates securely stored within SFUP have to be protected in a way that they cannot be overwritten in an unauthorized way or even never as might be the case when storing a root certificate as a trust anchor.

The algorithm 1 described above enables reliable one-time proof of a secure software update process. This is generally sufficient when allowing updates of software by specifically secured processes only. In this way, an external party (such as the OAM server 26 in the exemplary system 12) can be sure that after local software proof a system boots into an integer state executing the requested software (or software version). This is typically the required pre-condition for autonomous validation.

The external challenger (the OAM server 26 in the exemplary system 12) verifies that the software update process has been applied and that this update can be trusted. Further, it can be trusted that the new software will be effective (possibly following a re-boot).

It should be noted that in some embodiments of the invention (sometimes referred to as a "minimalist solution"), it is sufficient if the reference for the verification is reliably updated and confirmed (e.g. result stored as a hash value of software configuration object which expresses the exact software release). The normal secure boot process would then detect any deviation in conjunction with the verification with any other software on top of an initial updated seed, which is specific for an individual software release and then could (for instance) invalidate access to keys which are required for autonomous validation.

The invention ensures that a flash memory update is not possible via normal CPU operation. In the system 12, this is prevented via dedicated circuit logic. In an alterative arrangement described below with reference to FIG. 3, this is achieved using a secure process that separates normal CPU activities from update operations. In this context, 'normal' means any operation or instruction or sequence of instructions that could be controlled via software in RAM (user accessible memory). Any activity relevant for the update process requires specific privileges and should be technically enforced.

The system 12 described above shows a solution with an autonomous circuit (implementing the SFUP 24) that works independent from the CPU 16. Any software update request must be confirmed after the SFUP unit 24 has verified and reliably stored the new flash memory content, thus the operations 2 to 8 of the algorithm 1 described above are done in a mandatory and not interruptible sequence.

The software update can either affect the firmware currently used (in this case it must be assured that no problems arise due to run-time modifications, e.g. by running a copy of the firmware in RAM as long as the system is in operation) or a future version in a system that supports two (or more) firmware releases to allow fallback mechanisms. In the latter case a policy must be applied to enforce urgently required updates (e.g. by invalidating a previous, but risky firmware).

The SFUP process described above uses secured protocols/mechanisms (that should e.g. protect against replay and re-flash attacks, content modifications, provide proof of origin of SW package, check against root certificate) and may only be accessible via application programming interface (API) commands, e.g. it is receiving an integrity protected software blob and confirms successful update by signed reply. Specifically, protection against re-flashing old software (but signed by correct software issuer) requires handling of software releases. To that scope the SFPU might persistently store some information that allows comparison of the existing with the received software version.

The dynamic root for trust management (DRTM) might also be aware of software releases (e.g. a monotonic counter which is increased with every new software version) and might use this information to refuse obsolete software images on top of the DRTM.

The SFUP 24 has own secrets that are known to challenger (e.g. PKI based or shared secrets).

Note that in the figure above exclusively SFUP is enabled to modify the CRTM part in flash memory, but it may control also the entire flash content or also any other flash content, in addition to, or instead of, the CRTM.

The SFUP controlled part also contains some versioning information. Depending on design and security decisions SFUP may leave control over other parts than CRTM also to less secure update processes.

In the system 12 described above, the SFUP module 24 is physically separated from the CPU 12. The flash memory 20 (or at least CRTM part of the flash memory) is only flashable from the SFUP module 24. However, this arrangement is not essential; the invention can be implemented in other ways.

Figure 3:
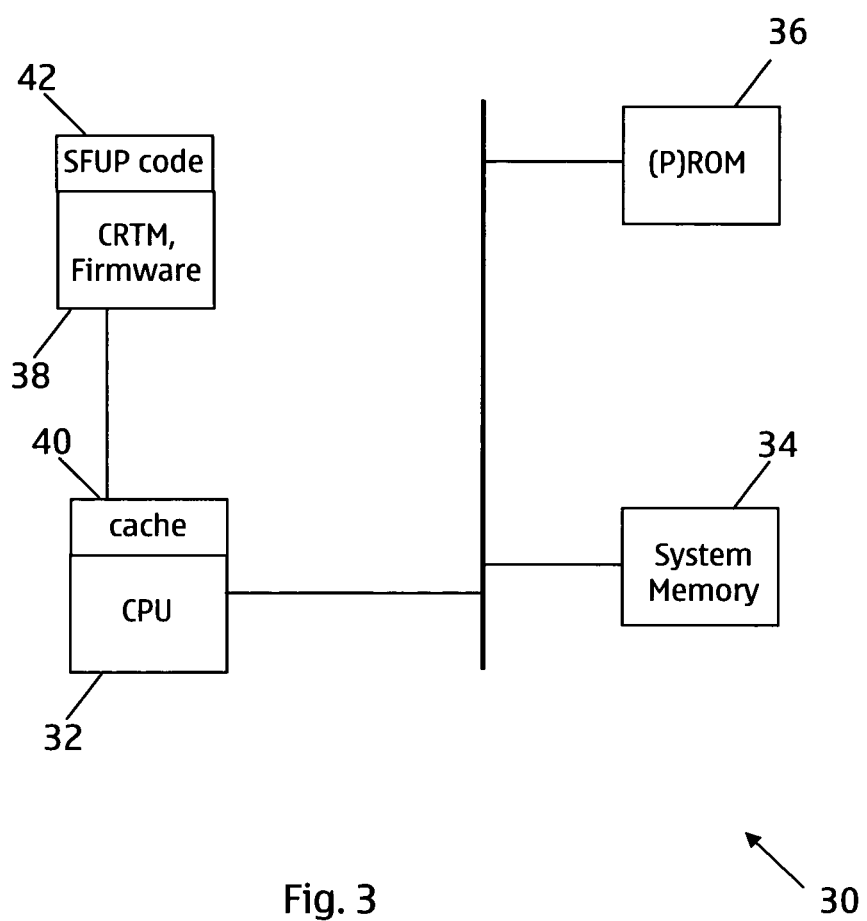
FIG. 3 shows a system in accordance with an aspect of the present invention.

For example, FIG. 3 shows an embodiment of the invention in which the same CPU is used for normal operation and for the secure update process. It is assumed that a (logically or even physically) protected CPU module exists, which separates some firmware part from normal system memory (note that this can be done by using a MMU or by physical design as indicated in the figure above).

FIG. 3 shows a system, indicated generally by the reference numeral 30, comprising a CPU 32, a system memory 34, a ROM 36, and firmware 38. The CPU has a cache memory 40 associated therewith. The firmware 38 includes the CRTM code and has the SFUP code 42 described above with reference to FIG. 2 associated therewith.

The CPU 32 distinguishes between two privilege levels (P1 and P2) ensuring that in P2 no write access to the firmware 38 is possible. Accordingly, in the privilege level P2, protected software code (such as the CRTM) cannot be modified. In this way, it is not possible for a normal software command to modify the content of the protected flash memory containing the sensitive P1 code. In particular, it is not possible for a software exploit to take control of the CPU 32 and change protected software code.

The only code which is authorized to allow changes (after running a verification process) is the SFUP code 42 which is entered by a securely designed application programming interface (API) (e.g. by jumping into allowed entry-points and updating parameters that can be stored outside but in e.g. an integrity protected way).

It may be required that a dedicated memory management unit (MMU) is used for protection and surveillance of API usage, e.g. when changing from P2 to P1 mode. Using other entry points than those defined with the API are ignored and/or may result in a failure state or message, but do not allow to start operations in P1 and in particular do not have any effect on the flash memory content.

The SFUP code fulfils the update steps 2 to 8 as described above with reference to FIG. 1. In the privilege level P1, these operations cannot be interrupted and are only confirmed on success of the complete sequence of operations. As this step 8 requires protected messages (e.g. signed messages) to inform the challenger about successful completion, cryptographic material and functionality must be protected and executed in P1 mode.

If the protected CPU memory unit 32 is realized as an integrated module or circuit it would even provide protection against physical attacks as the flash-memory content could almost never (i.e. only limited by the level of security a hardware integration can assure) be changed by any physical manipulation (e.g. exchange of complete flash-memory unit).

In an alternative form of the invention, a separate process on a normal CPU with a special state, which is visible and effective on the outside (to enable flashing) is provided. This separate process is entered via special entry only (e.g. DRTM as provided by Intel® for some x86-based processors) and the successful execution of the update operation must be verifiable. A DRTM based solution is feasible, e.g. if some additional logic is snooping CPU/TPM cycles and allows writing of flash memory only on successful instantiation of DRTM code.

A dedicated CPU module is shown and explained with reference to FIG. 2. As a simpler variant, also a dedicated memory management unit (MMU) could control access to SFUP (e.g. only accessible if CPU is executing secure, verified memory pages when addressing SFUP ports).

In the embodiments described above, the flash memory (such as the flash memory 20) could be any other boot device, e.g. an authenticated USB stick, which only accepts an authorized SFUP (implementation of these approaches may be different from the arrangements shown in FIGS. 2 and 3 above).

Furthermore, solutions using virtualisation are possible, enable flashing from one compartment/virtualized layer, but preventing it from the others.

For lower security requirements kernel mode processes might be possible. Also here the problem of how to avoid flashing access (hardware write access) by non-kernel processes arises. Future development could introduce some 'privileged commands', which may write certain ports to indicate some state, and may be executed in special protection realm only.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A module comprising:
    an input for receiving a request from an external source to update a software element of a system, wherein the system includes a central processing unit;
    an output for providing a response message to the external source indicating whether or not the update has been successfully completed; and
    a memory, wherein the software element is stored within said memory,
    wherein the module is adapted to modify the software in accordance with the request, wherein the module has write access to the software that is denied to the central processing unit,
    wherein the software element is stored within a portion of the memory that is programmable by the module but is not programmable by the central processing unit, wherein the module is provided as part of the central processing unit, and
    wherein the module is adapted to update said software element only when the central processing unit is operating in a protected mode.

2. A module as claimed in claim wherein the module is provided as part of said memory.

3. A module as claimed in claim 1, further comprising a checking module for checking the validity of the request.

4. A module as claimed in claim 1, wherein the module and the central processing unit are logically separated.

5. A module as claimed in claim 1, wherein the software element comprises initial trusted software and data.

6. A module as claimed in claim 1, wherein the module is the only entity having write access to the software element.

7. An apparatus comprising:
    an input for receiving a request from an external source to update a software element of a system;
    a central processing unit;
    a memory, wherein the software element is stored within said memory;
    a module adapted to modify the software in accordance with the request, wherein the module has write access to the software that is denied to the central processing unit; and an output for providing a response to the external source indicating whether or not the update has been successfully completed, wherein the module is provided as part of the central processing unit, wherein the module is adapted to update said software element only when the central processing unit is operating in a protected mode, and wherein the software element is stored within a portion of the memory that is programmable by the module but is not programmable by the central processing unit.

8. An apparatus as claimed in claim 7, wherein the module is provided as part of said memory.

9. An apparatus as claimed in claim 7, further comprising a checking module for checking the validity of the request.

10. An apparatus as claimed in claim 7, wherein the module and the central processing unit are logically separated.

11. An apparatus as claimed in claim 7, wherein the software element comprises initial trusted software and data.

12. An apparatus as claimed in claim 7, wherein the module is the only entity having write access to the software element.

13. A method comprising:

receiving, at a first module a request to update a software element of a system, wherein the system includes a central processing unit;

updating the software element under the control of the first module in accordance with the request, wherein the module has write access to the software that is denied to the central processing unit; and providing a message to a source of the request indicating whether or not the software has been successfully updated, wherein the module is provided as part of the central processing unit, wherein the module is adapted to update said software element only when the central processing unit is operating in a protected mode, wherein the software element is stored within a portion of memory that is programmable by the first module but is not programmable by the central processing unit, and wherein the first module is provided as part of said memory.

14. A method as claimed in claim 13, further comprising the first module taking control of the system from the central processing unit.

15. A method as claimed in claim 13, wherein the first module is provided as an autonomous circuit that works independently of the central processing unit.

16. A method as claimed in claim 13, further comprising checking the validity of the request.

17. A computer program product comprising:

means for receiving, at a first module a request to update a software element of a system, wherein the system includes a central processing unit;

means for updating the software element under the control of the first module in accordance with the request, wherein the module has write access to the software that is denied to the central processing unit; and means for providing a message to a source of the request indicating whether or not the software has been successfully updated, wherein the first module is provided as part of the central processing unit, wherein the first module is adapted to update said software element only when the central processing unit is operating in a protected mode, wherein the software element is stored within a portion of memory that is programmable by the first module but is not programmable by the central processing unit, and wherein the first module is provided as part of said memory.

\* \* \* \* \*

UNITED STATES PATENT AND TRADEMARK OFFICE
CERTIFICATE OF CORRECTION

PATENT NO. : 8,566,815 B2  
APPLICATION NO. : 13/318622  
DATED : October 22, 2013  
INVENTOR(S) : Manfred Schaefer et al.

Page 1 of 1

It is certified that error appears in the above-identified patent and that said Letters Patent is hereby corrected as shown below:

In the Claims:

Col. 10, line 48 (Claim 2, Line 1)

Please change "in claim wherein" to --in claim 1, wherein--

Signed and Sealed this
Twenty-eighth Day of January, 2014

Michelle K. Lee
*Deputy Director of the United States Patent and Trademark Office*